United States Patent
Lee (10) Patent No.: US 11,232,800 B2
(45) Date of Patent: Jan. 25, 2022

(54) PERSONALIZED TALKING DETECTOR FOR ELECTRONIC DEVICE

(71) Applicant: Google LLC, Mountain View, CA (US)

(72) Inventor: Jae Lee, Palo Alto, CA (US)

(73) Assignee: Google LLC, Mountain View, CA (US)

(*) Notice: Subject to any disclaimer, the term of this patent is extended or adjusted under 35 U.S.C. 154(b) by 35 days.

(21) Appl. No.: 16/710,189

(22) Filed: Dec. 11, 2019

(65) Prior Publication Data

US 2020/0342878 A1     Oct. 29, 2020

Related U.S. Application Data (60) Provisional application No. 62/837,443, filed on Apr. 23, 2019.

(51) Int. Cl.
| | |
|---|---|
| G10L 15/00 | (2013.01) |
| G10L 25/00 | (2013.01) |
| G10L 17/00 | (2013.01) |
| H04R 29/00 | (2006.01) |

(52) U.S. Cl.
CPC .......... *G10L 17/00* (2013.01); *H04R 29/004* (2013.01)

(58) Field of Classification Search
CPC ...... G06F 3/167; G10L 17/00; H04M 1/6066; H04M 1/72454; H04M 2250/74; H04R 29/004
USPC ................................................. 704/200, 246
See application file for complete search history.

(56) References Cited

U.S. PATENT DOCUMENTS

| | | | |
|---|---|---|---|
| 9,516,442 B1* | 12/2016 | Dusan | H04R 1/222 |
| 2011/0026722 A1* | 2/2011 | Jing | G10L 25/84 |
| | | | 381/71.1 |
| 2013/0133424 A1* | 5/2013 | Donaldson | A61B 5/02444 |
| | | | 73/510 |
| 2014/0093091 A1* | 4/2014 | Dusan | H04R 1/1083 |
| | | | 381/74 |
| 2014/0093093 A1* | 4/2014 | Dusan | H04R 3/005 |
| | | | 381/74 |
| 2015/0161998 A1* | 6/2015 | Park | G10L 25/78 |
| | | | 704/231 |
| 2016/0050304 A1* | 2/2016 | Tung | H04M 1/605 |
| | | | 455/570 |
| 2016/0205238 A1* | 7/2016 | Abramson | G08G 1/0137 |
| | | | 455/456.4 |
| 2016/0253996 A1* | 9/2016 | Peterson | G10L 15/22 |
| | | | 704/275 |
| 2017/0316779 A1* | 11/2017 | Mohapatra | G10L 15/22 |

(Continued)

OTHER PUBLICATIONS

International Search Report and Written Opinion for International Application No. PCT/US2019/065607 dated Mar. 2, 2020. 15 pages.

(Continued)

*Primary Examiner* — Khai N. Nguyen
(74) *Attorney, Agent, or Firm* — Lerner, David, Littenberg, Krumholz & Mentlik, LLP (57) ABSTRACT

The present disclosure provides for improved hot word detection in electronic devices, particularly small form factor devices such as wearables. The electronic device includes an accelerometer onboard to pick up voice in noisy conditions, and utilizes the accelerometer to confirm that a particular user intended to activate the hot word detection, thereby reducing false detection of other people's voices.

21 Claims, 5 Drawing Sheets

(56) References Cited

U.S. PATENT DOCUMENTS

2018/0068671 A1* 3/2018 Fawaz .................... G10L 17/10
2019/0272842 A1* 9/2019 Bryan .................... H04R 3/005
2020/0342878 A1* 10/2020 Lee .................. H04M 1/72454

OTHER PUBLICATIONS

International Preliminary Report on Patentability for International Application No. PCT/US2019/065607 dated Nov. 4, 2021. 9 pages.

\* cited by examiner

PERSONALIZED TALKING DETECTOR FOR ELECTRONIC DEVICE

CROSS-REFERENCE TO RELATED APPLICATIONS

The present application claims the benefit of the filing date of U.S. Provisional Patent Application No. 62/837,443 filed Apr. 23, 2019, the disclosure of which is hereby incorporated herein by reference.

BACKGROUND

Electronic devices may incorporate hot word detection, wherein the device responds to a particular word or phrase (e.g., "Hey, assistant") spoken by a user without any other manual input, such as button presses. Because such devices are always on, an amount of power consumption required to support the hot word detection may be burdensome. Moreover, it is difficult to train the device to detect the voices of only particular users because of limited memory space. As a result, the hot word detection feature is often falsely triggered by other people's voices.

BRIEF SUMMARY

The present disclosure provides for improved hot word detection in electronic devices, particularly small form factor devices such as wearables. The device includes an accelerometer onboard to pick up voice in noisy conditions, and utilizes the accelerometer to confirm that a particular user intended to activate the hot word detection, thereby reducing false detection of other people's voices.

One aspect of the disclosure provides a method for detecting, by an electronic device, whether a specific user is speaking. The method includes receiving, by one or more processors, an accelerometer signal from an accelerometer, receiving, by the one or more processors, a voice signal from a microphone, determining, based on the voice signal and the accelerometer signal, whether the specific user is talking, listening, by the one or more processors through the microphone, for commands when the specific user is talking, and ignoring, by the one or more processors, the received voice signals when the specific user is not talking.

According to some examples, the method may further include activating the microphone, such as by transitioning the microphone from a low-power or powered-off state to a powered-on state, in response to receiving the accelerometer signal.

According to some examples, determining whether the specific user is talking includes comparing the received accelerometer signal to a predetermined threshold. The predetermined threshold may be updated based on historical accelerometer signals from the specific user.

Another aspect of the disclosure provides an electronic device, comprising an accelerometer, a microphone, and one or more processors in communication with the accelerometer and the microphone. The one or more processors are configured to receive an accelerometer signal from the accelerometer, receive a voice signal from the microphone, determine, based on the voice signal and the accelerometer signal, whether a specific user is talking, listen, through the microphone, for commands when the specific user is talking, and ignore the received voice signals when the specific user is not talking.

The electronic device may be, for example, a wearable device, where the specific user is wearing the electronic device. For example, the electronic device may be a head-mounted device, such as earbuds, a headset, or smart glasses.

Yet another aspect of the disclosure provides for a computer-readable medium storing instructions executable by one or more processors for performing a method of detecting whether a specific user is speaking. The method includes receiving an accelerometer signal, receiving a voice signal, determining, based on the voice signal and the accelerometer signal, whether the specific user is talking, listening for commands when the specific user is talking, and ignoring the received voice signals when the specific user is not talking.

DETAILED DESCRIPTION

Figure 1:
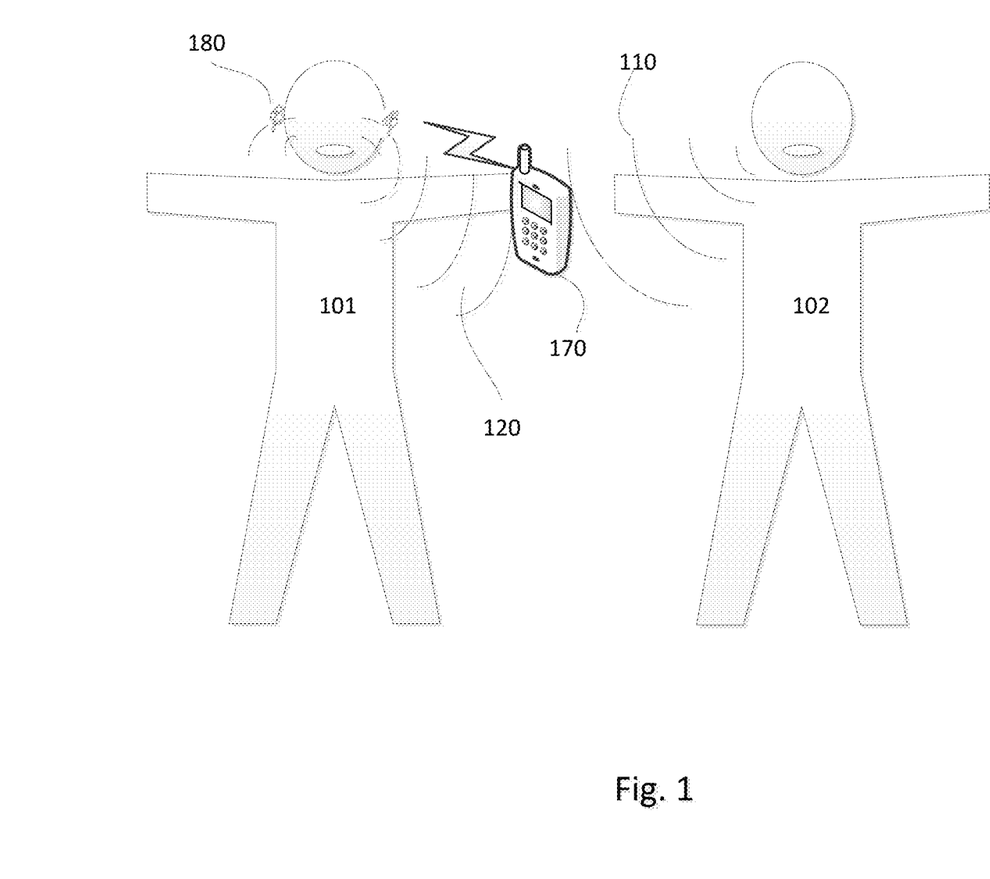
FIG. 1 is a pictorial diagram of an example system in use according to aspects of the disclosure.

FIG. 1 is a pictorial diagram of an example system in use. A first user 101 is wearing an electronic device 180 for detecting user voice input. While the electronic device 180 is shown as earbuds in FIG. 1, it should be understood that the electronic device 180 may be any of a number of other types of devices, such as headsets, smart glasses, smart motorcycle helmets, smart watch, etc. Moreover, the electronic device 810 may include a plurality of devices in communication with one another, such as a smartwatch in communication with wireless earbuds.

As shown in FIG. 1, the electronic device 180 is wirelessly coupled to mobile computing device 170. The mobile computing device 170 may be, for example, a mobile phone, tablet, laptop, gaming system, or any other type of mobile computing device. In some examples, the mobile computing device 170 may be coupled to a network, such as a cellular network, wireless Internet network, etc. For example, the user 101 may provide speech input 120 to the mobile computing device 170, through the electronic device 180, for further transmission over a network to another device. However, in other examples the electronic device 180 may communicate directly over a network without the mobile computing device 170.

In some scenarios, such as shown in FIG. 1, a second user 102 may also be speaking with or near the first user 101. Such speech 110 may be detected by the electronic device 180 and/or the mobile phone 170 and perceived as input. Accordingly, a microphone of the electronic device 180 may continue to receive the speech 110 of the second user 102, thereby draining a battery of the electronic device 180 and possibly triggering false commands. To avoid this, the electronic device 180 may detect speech 120 specific to the first user 101. For example, the electronic device 180 may include one or more accelerometers that detect movements of the first user 101 consistent with movement of the user's mouth, as would occur when the user is talking. When such movement is detected, the microphone may automatically switch on to receive the speech 120 of the first user 101.

Figure 2:
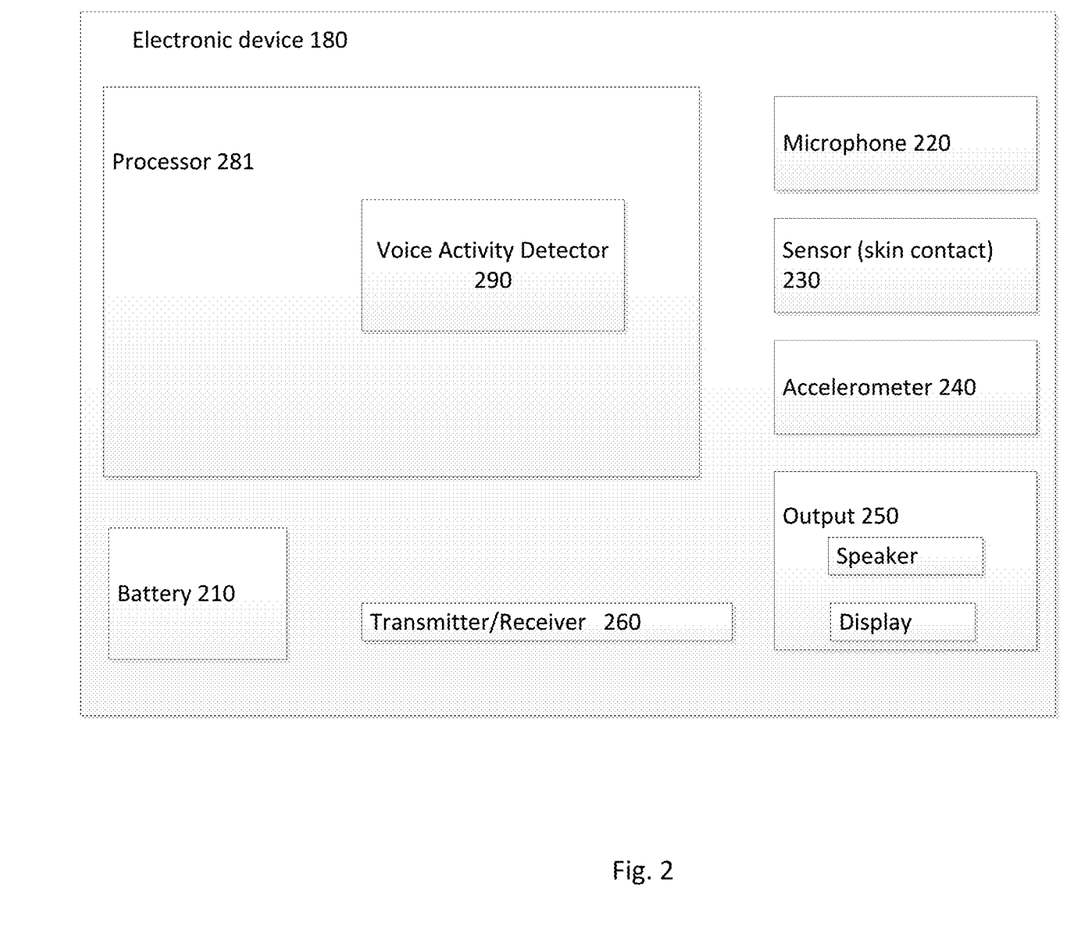
FIG. 2 is a functional block diagram illustrating an example electronic device according to aspects of the disclosure.

FIG. 2 illustrates example structural components of the electronic device 180 that provide for such detection of when a particular user begins to provide speech input. While a number of example components are shown, it should be understood that additional or fewer components may be included. Moreover, multiple components of a same type, such as a plurality of processors, microphones, accelerometers, etc., may be included, despite that only one is shown in FIG. 2.

The electronic device 180, as shown in FIG. 1, include one or more processors 281 in communication with various other components, such as a battery 210, microphone 220, sensors 230, accelerometers 240, output 250, transmitter/receiver 260, etc. For example, as described in more detail below, the one or more processors 281 may include a voice activity detector 382 that uses readings from the sensors 230 and/or accelerometers 240 to detect when a particular user is talking, and cause battery 210 to power the microphone to receive speech emitted by the particular user. The speech may be a voice command, such as "turn up the volume" or "shuffle songs on my favorite playlist." In other examples, the speech may be dialogue to be transmitted over a network, such as during a telephone conversation with another user. A response to the input may be output to the user, such as by playing sounds through a speaker. In some cases, the output may include a display, such as for displaying images, text, videos, status information, or any other type of information.

The battery 210 may be any type of small form factor power supply for powering the components of the electronic device 180. The battery 210 may supply power to the processor 281, microphone 220, accelerometer 240, etc. individually, such that any individual component may be powered down to preserve life of the battery 210 while other components remain powered on.

Determination of which components to power may be made automatically, for example, by the processor 281. For example, the processor 281 may include a voice activity detector 290 that detects when a specific user is talking. The voice activity detector 290 may be, for example, a software module executed by the processor 281 that uses information from the sensors 230, accelerometer 240, or other components to determine when a specific user is providing input. For example, the voice activity detector 290 may compare readings from the accelerometer 240 to a threshold.

The threshold may correspond to a level of movement that is consistent with a user talking. When the readings meet or exceed the threshold, it may be determined that the user is talking. The specific threshold may vary depending on, for example, a type of wearable device in which the accelerometer resides. For example, the threshold for earbuds may differ from the threshold for a head-mounted display. According to some examples, the threshold may be defined with respect to a noise floor. For example, the threshold may be 6 dB above the noise floor, 10 dB above the noise floor, etc.

The microphone 220 may be any microphone capable of receiving sound as input. In addition to receiving speech input from the user, the microphone 220 may receive other sounds, such as background noise, other people talking, etc. In some examples, the microphone 220 may include multiple microphones positioned at different portions of the electronic device 180. By way of example only, a first beamformed microphone may be angled towards the user's mouth when the electronic device 180 is worn so as to receive the user's voice input, while a second microphone is positioned at an outer portion of the electronic device 180 to receive background noise or voice input from others that are interacting with the user.

The sensors 230 may include any of a variety of types of sensors. According to one example, the sensors 230 may detect whether the electronic device 180 is being worn by the user. For example, the sensors 230 may include capacitive sensors, thermal sensors, or other sensors for detecting whether the electronic device 180 is in contact with skin, thereby indicating whether the electronic device 180 is being worn.

The accelerometer 240 may include one or more device for detecting movement of the user that is consistent with the user talking. For example, referring back to FIG. 1, when the user 101 wearing electronic device 180 begins talking, his mouth, jaw, and other parts of his body move. Such movement may indicate talking. The accelerometer 240 may also detect other types of movements that may be distinguished from the user talking. For example, while the accelerometer 240 may detect movements consistent with the user walking, typing, driving, etc., such movements can be distinguished from the talking movements and may be ignored. For example, motion may have a slower frequency response as compared to talking. While a person running may translate to approximately 3 Hz of frequency, a person talking may translate to approximately 100 Hz or more. Accordingly, a low pass filter may be placed at, for example, sub 10 s of Hz or lower.

Figure 5:
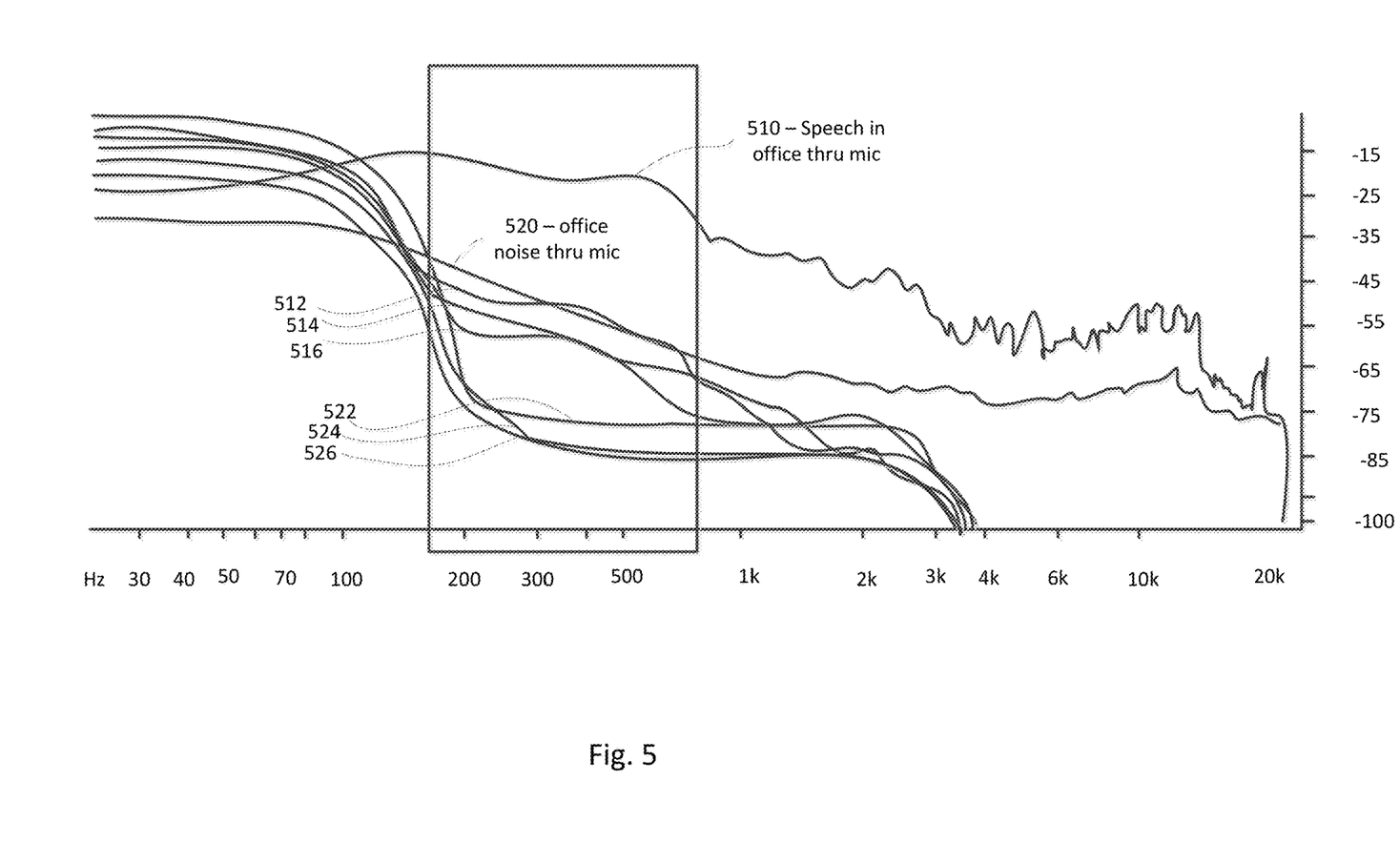
FIG. 5 is a waveform diagram illustrating example accelerometer readings according to aspects of the disclosure.

FIG. 5 illustrates example accelerometer readings indicating that the user is talking. Waveform 510 represents user speech received through a microphone in an office setting. Waveform 520 represents background office noise received through the microphone, which corresponds to a noise floor in this example. Waveforms 512, 514, 516 represent accelerometer readings in the Z-, X-, and Y-directions, respectively, corresponding to the user speech. Waveforms 522, 524, 526 represent accelerometer readings in the Z-, X-, and Y-directions, respectively, corresponding to the office noise. Looking at a frequency band between approximately 200 Hz and 700 Hz, the speech accelerometer readings 512, 514, 516 when the user is talking is approximately 30 dB above the noise floor accelerometer readings 522, 524, 526.

According to some examples, a plurality of accelerometers 240 may be included in the electronic device 180. For example, each of the plurality of accelerometers 240 may have a different sensitivity, or may be adapted to detect different types of user activity. Further, each of the plurality of accelerometers may be positioned in a different way to optimize detection of the different types of user activity.

The microphone 220 may be powered down or may operate in a low power mode when accelerometer reading are inconsistent with talking. For example, when the user is not providing speech input, the microphone may be switched off. When the accelerometer reading indicate user talking, however, the microphone may be switched on to receive the user voice input. If the user is determined to be having a conversation, such as if a pattern of accelerometer readings indicate activity where the user is talking for some period of time, stops, and then resumes talking, the microphone may in some examples operate in a reduced power mode during the times when the user has stopped talking. According to some examples, the accelerometer may always be powered by the battery 210, such that signals from the accelerometer 240 may be used to determine when to turn on other components, such as the microphone 220. In this regard, the accelerometer 240 may still preserve battery life by remaining in a low power mode until movement is detected, and then switching to a full power operation mode.

The output 250 may include, for example, a display, a speaker, or any combination of these or other outputs. According to some examples, the output may provide an indication to the user when the microphone is powered on and receiving voice input.

The transmitter/receiver 260 may be used for communicating with other devices. For example, where the user is having a conversation, the transmitter/receiver 260 may be used to send the received voice of the user to another device and receive signals from the other device for output to the user through output 250.

According to some examples, the processor 281 may determine whether the user is talking based on other information, in addition to the accelerometer readings. By way of example only, the processor 281 may be trained, such as through machine learning, to recognize the user's voice. For example, the user may be asked to provide sample speech input, which is stored in a memory of the device 180 and used for comparison with received speech.

Figure 3:
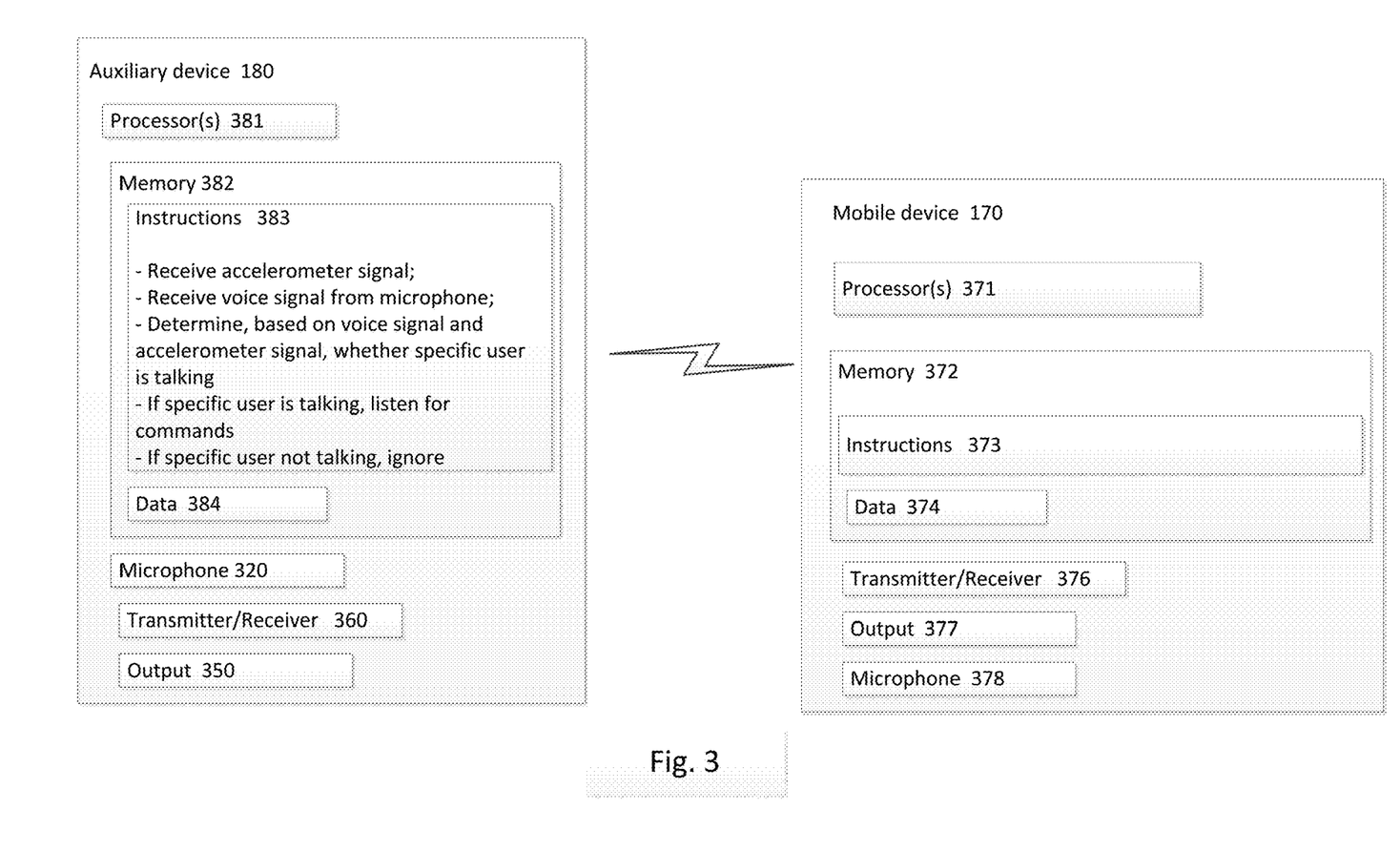
FIG. 3 is a functional block diagram illustrating an example system according to aspects of the disclosure.

FIG. 3 provides an example functional block diagram of the electronic device 180 in communication with the mobile device 170. Each device includes one or more processors 371, 381, memory 372, 382, and other components typically present in mobile computing devices and electronic devices. While a number of components are shown, it should be understood that such components are merely non-limiting examples, and that other components may additionally or alternatively be included.

As mentioned above, the electronic device 180 can be any of various types of devices, such as earbuds, head-mounted device, smart watch, etc. The mobile device 170 can also take a variety of forms, such as smart phone, tablet, laptop, game console, etc.

The one or more processors 371, 381 may be any conventional processors, such as commercially available microprocessors. Alternatively, the one or more processors may be a dedicated device such as an application specific integrated circuit (ASIC) or other hardware-based processor. Although FIG. 3 functionally illustrates the processor, memory, and other elements of electronic device 180 and mobile computing device 170 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the electronic device 180 or mobile computing device 170. Accordingly, references to a processor or computing device will be understood to include references to a collection of processors or computing devices or memories that may or may not operate in parallel.

Memory 382 may store information that is accessible by the processors 381, including instructions 383 that may be executed by the processors 381, and data 384. The memory 382 may be of a type of memory operative to store information accessible by the processors 381, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 383 and data 384 are stored on different types of media.

Data 384 may be retrieved, stored or modified by processors 381 in accordance with the instructions 383. For instance, although the present disclosure is not limited by a particular data structure, the data 384 may be stored in computer registers, in a relational database as a table having a plurality of different fields and records, XML documents, or flat files. The data 384 may also be formatted in a computer-readable format such as, but not limited to, binary values, ASCII or Unicode. By further way of example only, the data 384 may be stored as bitmaps comprised of pixels that are stored in compressed or uncompressed, or various image formats (e.g., JPEG), vector-based formats (e.g., SVG) or computer instructions for drawing graphics. Moreover, the data 384 may comprise information sufficient to identify the relevant information, such as numbers, descriptive text, proprietary codes, pointers, references to data stored in other memories (including other network locations) or information that is used by a function to calculate the relevant data.

The instructions 383 may be executed to detect when the user is talking and to receive the user's voice input. For example, the instructions 383 provide for listening for and receiving user speech, for example, through microphone 320. The microphone 320 may be beamformed, such that it is directed to receive audio coming from a direction of the user's mouth. In this regard, the electronic device 180 may recognize received speech as being that of the user, as opposed to other speakers that are not wearing the electronic device 180 or other background noise.

According to some examples, the instructions 383 may further provide for detecting an endpoint in the received speech. For example, the endpoint may be automatically determined based on a pause in speech, key words, intonation, inflection, or any of a combination of these or other factors. Once the endpoint is detected, the electronic device 180 may buffer the received speech while immediately resuming listening. In other examples, alternatively or additionally to buffering, the electronic device 180 may transmit the received speech to the mobile device 170. For example, the electronic device 180 may transmit the speech via an RFComm or other communication link. In some examples, such endpointing may be performed by the mobile device 170. In such examples, the electronic device 180 may stream all audio to the mobile device 170, which handles endpointing, voice recognition, etc.

While the electronic device 180 is executing the instructions 383, the mobile device 170 may also be executing instructions 373 stored in memory 372 along with data 374. For example, similar to the electronic device 180, the mobile device 170 may also include memory 372 storing data 374 and instructions 373 executable by the one or more processors 371. The memory 372 may be any of a variety of types, and the data 374 may be any of a variety of formats, similar to the memory 382 and data 384 of the electronic device 180. While the electronic device 180 is listening for and receiving speech from the user wearing the electronic device 180, the mobile device 170 may be listening for and receiving speech as well through microphone 378. According to some examples, the speech received by the mobile device 170 may be used to filter input received through the electronic device 180. For example, input received through the mobile device 170 may be compared to input received through the electronic device 180 to determine whether it is from the user wearing the electronic device 180 or from another. In this regard, any of a variety of voice recognition techniques may be used. As one example, the mobile device 170 may cross reference a volume level between the electronic device microphone 320 and the mobile device microphone 378. If the sound received through microphone 320 is quiet and the sounds received through the microphone 378 is loud, then it may be determined that another person is providing speech input. Conversely, if the sounds received through both microphones 320, 378 is loud, then it may be determined that the user/wearer of electronic device 180 is speaking. As another example technique, a voice recognition unit may be used. The voice recognition unit may be trained to recognize a voice of the user of the electronic device 180 and mobile device 170. As yet another example technique, audio echo cancellation techniques may be used. For example, the mobile device 170 may listen to both microphone 388, 378, detect overlapping audio, and, recognize that the overlapping audio belongs to the owner. The overlapping audio may be detected by identifying similar waveforms or patterns of sound input, or detecting similar plosives or transient attacks. In some examples, any combination of the foregoing or other techniques may be used.

When it is determined that the user is talking, the instructions 373 may further provide for continued listening, for example, until an endpoint is detected. As mentioned above, the endpoint may be detected based on a pause, keyword, inflection, or other factor. In other examples, the endpoint may be detected based on a decrease in activity detected by the accelerometers. For example, when the accelerometer readings drop, indicating that the user has stopped talking, the microphone may stop listening for speech input until the accelerometer readings pick up again.

It should be understood that the electronic device 180 and mobile device 170 may each include other components which are not shown, such charging input for the battery, signals processing components, etc. Such components may also be utilized in execution of the instructions 383, 373.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
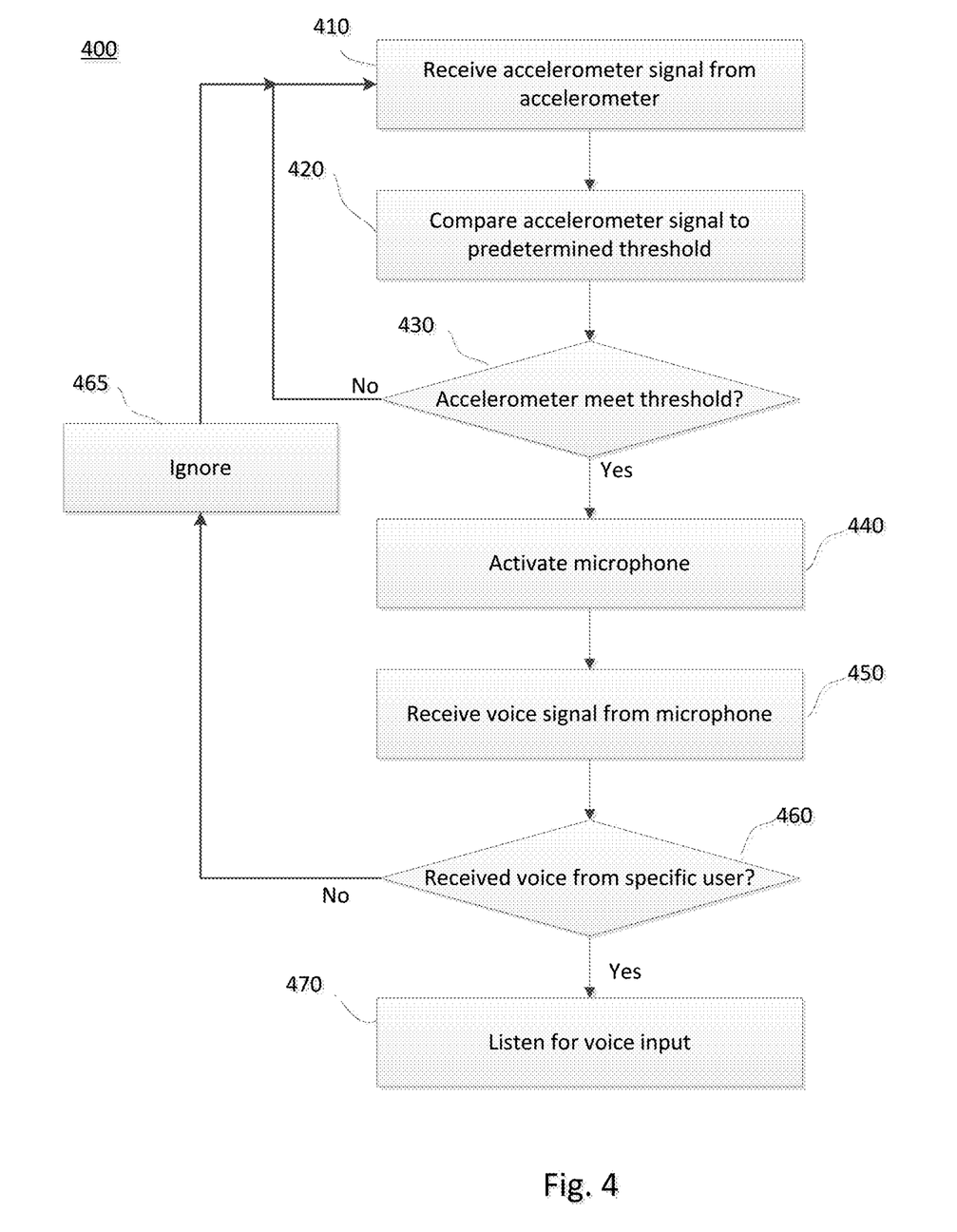
FIG. 4 is a flow diagram illustrating an example method executed by an audio device with an active microphone according to aspects of the disclosure.

FIG. 4 illustrates a method 400 for detecting whether a user is talking. In block 410, an accelerometer signal is received at one or more processors from an accelerometer. The accelerometer signal may in some examples include multiple signals from a plurality of accelerometers inside one device or inside different coupled devices.

In block 420, the received accelerometer signal is compared to a threshold, wherein the threshold indicates user activity consistent with talking. In block 430, it is determined whether the received accelerometer signal meets the threshold. If not, the process may return to block 410 where the processor continues to monitor accelerometer signals. If so, however, the microphone is activated in block 440.

Activation of the microphone may include powering on the microphone from a low-power or no-power state, or otherwise preparing the microphone to receive user voice. Accordingly, the microphone may receive the user voice as input.

In block 450, the processor receives the user voice through the activated microphone. According to some examples, the processor may confirm in block 460 whether the received used voice is from an intended user, such as the specific user wearing the electronic device. For example, the processor may use voice recognition techniques or a further comparison of the received voice signal to the accelerometer signals received for a same time period to determine whether the voice and accelerometer signals correspond to one another. According to further examples, other analysis techniques may be used to determine whether the received voice signal is that of the user. For example, a comparison of the signal to signals received at a second device, such as a mobile device, may be used. In other examples, speech recognition may be used to determine whether the received voice signal includes speech or merely background noises.

If it is determined in block 450 that the received voice is that of the intended user, the processor may continue listening for voice input through the microphone in block 460. If not, the processor may ignore the received signal in block 465 and continue monitoring the acceleration signals in block 410.

The foregoing techniques may be advantageous in that they provide for activation of components, such as the microphone, only when needed. By monitoring the acceleration signals, the microphone and other components needed to receive voice input may be powered off or placed into a low-power mode until it is detected that the user is speaking. Moreover, such detection is automated, and therefore does not inconvenience the user by requiring the user to press a button or enter some other input prior to speaking.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for detecting, by an electronic device, whether a specific user is speaking, the method comprising:
   receiving, by one or more processors, an accelerometer signal from an accelerometer;
   determining that the accelerometer signal exceeds a predetermined threshold;
   receiving, by the one or more processors, a voice signal from a microphone;
   determining, by using a comparison of the voice signal with the accelerometer signal, whether the specific user is talking;
   listening, by the one or more processors through the microphone, for commands when the specific user is talking; and
   ignoring, by the one or more processors, the received voice signals when the specific user is not talking.

2. The method of claim 1, wherein the electronic device is a wearable device, and the specific user is wearing the electronic device.

3. The method of claim 2, wherein the electronic device is a head-mounted device.

4. The method of claim 3, wherein the head-mounted device comprises one of:
   earbuds, a headset, or smart glasses.

5. The method of claim 1, further comprising activating the microphone in response to receiving the accelerometer signal.

6. The method of claim 5, wherein activating the microphone comprises transitioning the microphone from a low-power or powered-off state to a powered-on state.

7. The method of claim 1, further comprising updating the predetermined threshold based on historical accelerometer signals from the specific user.

8. The method of claim 1, wherein the predetermined threshold indicates user activity consistent with talking and is dependent on a type of the electronic device.

9. An electronic device, comprising:
an accelerometer;
a microphone; and
one or more processors in communication with the accelerometer and the microphone, the one or more processors configured to:
 receive an accelerometer signal from the accelerometer;
 determine that the accelerometer signal exceeds a predetermined threshold;
 receive a voice signal from the microphone;
 determine, by using a comparison of the voice signal with the accelerometer signal, whether a specific user is talking;
 listen, through the microphone, for commands when the specific user is talking; and
 ignore the received voice signals when the specific user is not talking.

10. The electronic device of claim 9, wherein the electronic device is a wearable device, and the specific user is wearing the electronic device.

11. The electronic device of claim 10, wherein the electronic device is a head-mounted device.

12. The electronic device of claim 11, wherein the head-mounted device comprises one of: earbuds, a headset, or smart glasses.

13. The electronic device of claim 9, wherein the one or more processors are further configured to activate the microphone in response to receiving the accelerometer signal.

14. The electronic device of claim 13, wherein activating the microphone comprises transitioning the microphone from a low-power or powered-off state to a powered-on state.

15. The electronic device of claim 9, wherein the one or more processors are further configured to update the predetermined threshold based on historical accelerometer signals from the specific user.

16. The electronic device of claim 9, wherein the predetermined threshold indicates user activity consistent with talking and is dependent on a type of the electronic device.

17. A non-transitory computer-readable medium storing instructions executable by one or more processors for performing a method of detecting whether a specific user is speaking, the method comprising:
 receiving an accelerometer signal;
 determine that the accelerometer signal exceeds a predetermined threshold;
 receiving a voice signal;
 determining, by using a comparison of the voice signal with the accelerometer signal, whether the specific user is talking;
 listening for commands when the specific user is talking; and
 ignoring the received voice signals when the specific user is not talking.

18. The non-transitory computer-readable medium of claim 17, wherein the method further comprises activating a microphone in response to receiving the accelerometer signal.

19. The non-transitory computer-readable medium of claim 18, wherein activating the microphone comprises transitioning the microphone from a low-power or powered-off state to a powered-on state.

20. The non-transitory computer-readable medium of claim 17, further comprising updating the predetermined threshold based on historical accelerometer signals from the specific user.

21. The non-transitory computer-readable medium of claim 17, wherein the predetermined threshold indicates user activity consistent with talking and is dependent on a type of an electronic device by which the accelerometer signal is received.

* * * * *